United States Patent
Tigerholm

Patent Number: 5,937,830
Date of Patent: Aug. 17, 1999

[54] FUEL OIL COOLER FOR DIESEL ENGINES

[76] Inventor: Lars Tigerholm, Bäckbornas väg 41, 168 60, Bromma, Sweden

[21] Appl. No.: 09/004,849

[22] Filed: Jan. 9, 1998

[30] Foreign Application Priority Data

Jan. 9, 1997 [SE] Sweden ................................. 9700044

[51] Int. Cl.$^6$ ...................................................... F01D 7/14
[52] U.S. Cl. ............................................................ 123/541
[58] Field of Search .................................... 123/541, 540, 123/542, 547

[56] References Cited

U.S. PATENT DOCUMENTS

| | | |
|---|---|---|
| 4,491,117 | 1/1985 | Koide . |
| 4,728,306 | 3/1988 | Schneider ................. 123/541 |
| 4,768,492 | 9/1988 | Widmer et al. . |
| 5,832,903 | 11/1998 | White et al. ............................. 123/541 |

FOREIGN PATENT DOCUMENTS 3740811  6/1989  Germany .

*Primary Examiner*—Marguerite McMahon
*Attorney, Agent, or Firm*—Walter Ottesen

[57] ABSTRACT

The invention relates to a fuel cooler for increasing the output of a diesel engine installed primarily in motor boats. A fuel line (10,15) is provided upstream of the fuel supply pump (16). A fuel oil cooler (5) is connected into the fuel line (10, 15) and is mounted on the existing sea water pump (8) of the engine in lieu of the ordinary pump cover. The fuel oil flowing through the fuel oil cooler (5) is cooled by the cooling water circulating in the pump (8). A further increase in output of the engine is achieved by installing an oil deaerator (11) upstream of the fuel oil cooler (5).

12 Claims, 1 Drawing Sheet

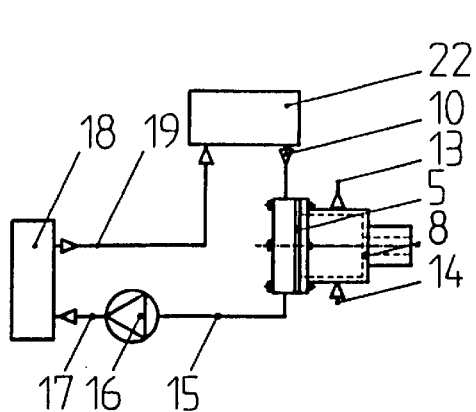
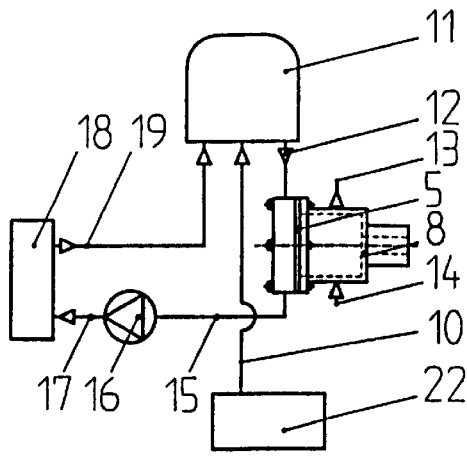
Fig. 1a  Fig. 1b
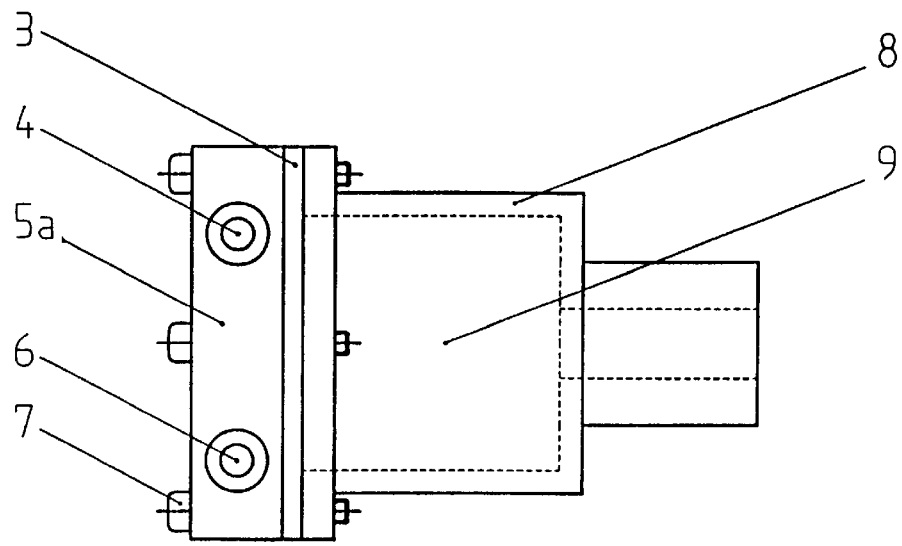
Fig. 2
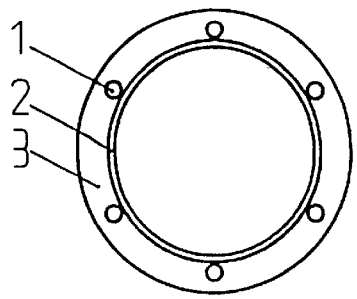
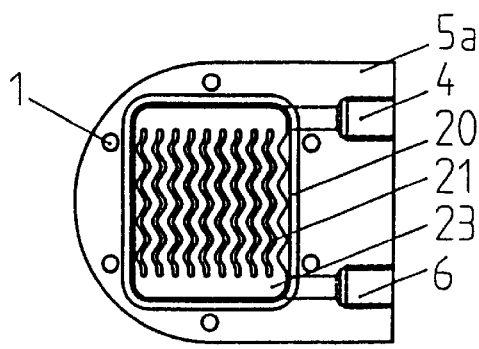
Fig. 3  Fig. 4

FUEL OIL COOLER FOR DIESEL ENGINES

BACKGROUND OF THE INVENTION

In diesel engines, especially those used in motor boats, the relatively high temperature of the fuel upstream of the fuel injection pump often prevents the development of full engine power. One reason is that the high temperature of the diesel oil reduces the engine output per liter of fuel, another that the diesel oil is partly vaporized due to partial pressure and friction effects in the line between the tank and the injection pump. These problems can be overcome by installing a fuel oil cooler in the fuel line ahead of the fuel pump, while further improvement can be achieved by installing an oil deaerator upstream of the fuel oil cooler.

Those fuel oil coolers which are available in the marketplace are relatively complicated to install, require a separate, low-temperature cooling water supply, and incur a high cost.

SUMMARY OF THE INVENTION

It is an object of the invention to increase the output of a diesel engine by providing a simple and easily installed fuel oil cooler.

The fuel oil cooler is mounted on the already existing sea water pump of the engine in lieu of the ordinary pump cover. The fuel oil cooler may suitably be made of a material, such as brass, having a high thermal conductivity. One part of the cooler comprises a cover mounted tightly against the sea water pump and the other part has a cooler housing with internal cooling baffles forming a series of passages though which the fuel is made to flow. One of the ends of the cooler housing is provided with two internally threaded holes for connecting respective inlet and outlet fuel lines.

Both the cover and the cooler housing are provided with a number of clearance holes for accommodating screws or bolts used to mount the fuel oil cooler on the flange of the cooling water pump. The holes are of the same pitch as the existing, threaded mounting holes in the flange. The flow of fuel through the passages in the cooler housing gives rise to turbulence, ensuring efficient heat transfer between the fuel and the cooler, which is cooled by the water flow through the sea water pump.

An oil deaerator can be installed between the fuel tank and the fuel oil cooler to further increase the output of the diesel engine. This affords the advantages, firstly, that the fuel is free of air and entrained gases when entering the injection pump and, secondly, that the return line between the injection pump and the tank can thereby be omitted.

BRIEF DESCRIPTION OF THE DRAWINGS

The invention will now be described in greater detail with reference to the drawings wherein:

FIG. 1a is a schematic of the fuel supply circuit from the tank, through the fuel oil cooler to the fuel supply pump and injection pump and back to the tank;

FIG. 1b is a schematic of an arrangement similar to that shown in FIG. 1a wherein an oil deaerator is also included in the fuel supply circuit;

FIG. 2 is a side elevation view of a fuel oil cooler mounted on a sea water pump;

FIG. 3 is a section view of the cover of the fuel oil cooler; and,

FIG. 4 is a second view of the housing of the fuel oil cooler.

DESCRIPTION OF THE PREFERRED EMBODIMENTS OF THE INVENTION

In FIG. 1a, a fuel oil cooler 5 is mounted on a sea water pump 8 having a sea water inlet 14 and a sea water outlet 13. From the fuel tank 22, the fuel line 10 runs to the fuel oil cooler 5 from which the line 15 runs to the fuel supply pump 16. The line 17 runs from the fuel supply pump 16 and is connected to the fuel injection pump 18, from which the return line 19 runs to the fuel tank.

In FIG. 1b, the fuel line 10 runs from the fuel tank 22 to an oil deaerator 11. The line 12 runs from the oil deaerator and is connected to the fuel oil cooler 5. In this case, the return line 19 runs from the fuel injection pump 18 and is connected to the oil deaerator 11.

FIG. 2 shows the sea water pump 8 and its impeller chamber 9. The cover 3 and cooler housing 5a of the oil cooler are mounted on the sea water pump by means of mounting screws 7. Threaded holes for the fuel inlet 4 and fuel outlet 6 connections, respectively, are provided in the cooler housing 5a.

FIG. 3 is a cross section of the cover 3 as viewed from the sea water pump. FIG. 3 shows the clearance holes 1 for the mounting screws 7 and an annular groove 2 for an O-ring seal fitted to seal the cover 3 against the flange of the sea water pump 8.

FIG. 4 is a cross section of the cooler housing 5a as viewed from the cover 3. The housing cavity 23 is occupied by a series of corrugated cooling baffles 21 arranged in parallel at right angles to the cover and spaced at equal intervals within the cavity. The end portion of the cooler housing 5a is provided with two internally threaded holes 4 and 6 for connecting the inlet and outlet fuel lines, respectively. The holes 4 and 6 connect to respective ends of the rectangular cavity 23.

FIG. 4 also shows the groove 20 provided for fitting an O-ring seal to seal the housing 5a with the cover 3 as well as the clearance holes 1 for the mounting screws 7.

The invention is not limited to the embodiment shown, but allows for other possible designs of cooler housing. For example, the cooling baffles may be arranged parallel to the cover and/or be made as an integral part of the cover. Alternatively, the cooler housing and cover may be configured as a unit in the form of a metal plate provided with a series of drilled passages through which the fuel flows.

It is understood that the foregoing description is that of the preferred embodiments of the invention and that various changes and modifications may be made thereto without departing from the spirit and scope of the invention as defined in the appended claims.

What is claimed is:

1. A fuel cooler for an internal combustion engine equipped with a sea water pump for pumping sea water to cool the engine, the sea water pump having a pump housing defining a chamber through which sea water is pumped, the fuel cooler comprising:

a cooler housing mounted on said pump housing and having a cavity formed therein for receiving said fuel;

said cooler housing and said pump housing conjointly defining an interface between said chamber and said cavity;

a cover mounted at said interface for closing off said cavity and said chamber so as to permit heat to be transferred from said fuel to said sea water through said cover during operation of said engine thereby cooling said fuel; and, said cooler housing having a fuel inlet at a first end of said cavity and a fuel outlet at a second end of said cavity to facilitate the continuous flow of fuel through said cavity.

2. The fuel cooler of claim 1, wherein said internal combustion engine is a diesel engine and said fuel is diesel fuel oil for said diesel engine.

3. The fuel cooler of claim 2, further comprising a set of mutually parallel corrugated baffle elements arranged in said cavity so as to be at right angles to said cover.

4. The fuel cooler of claim 3, said baffle elements extending between said first and second ends to conjointly define a plurality of passages between said ends through which said fuel oil flows in said cavity.

5. The fuel cooler of claim 4, said baffle elements being spaced equidistant from each other.

6. The fuel cooler of claim 4, wherein said cover is made of a material having a high thermal conductivity.

7. The fuel cooler of claim 6, wherein said cover is made of brass.

8. The fuel cooler of claim 2, further comprising a first seal seat formed between said cooler housing and said cover and a second seal seat formed between said cover and said pump housing; and, first and second O-ring seals disposed in said first and second seal seats, respectively.

9. The fuel cooler of claim 2, fastener means for fastening said cooler housing and said cover to said pump housing.

10. The fuel cooler of claim 9, said fastener means including a plurality of threaded bores formed in said pump housing; and, a plurality of threaded mounting bolts engaging said cooler housing and said cover and threadably engaging corresponding ones of threaded bores to tightly hold said cooler housing and said cover on said pump housing.

11. The fuel cooler of claim 1, further comprising a deaerator mounted upstream of said fuel inlet for deaerating the fuel before the fuel enters said cavity.

12. The fuel cooler of claim 1, wherein said cover is a single cover made of a material having a high thermal conductivity.

* * * * *